United States Patent

De Loze de Plaisance et al.

Patent Number: 6,125,900
Date of Patent: Oct. 3, 2000

[54] TIRE FOR AIRPLANE WITH CROWN REINFORCEMENT INCLUDING AT LEAST ONE TWIN ZIG-ZAG PLY

[75] Inventors: Pierre De Loze de Plaisance, deceased, late of Clermont-Ferrand, by Anne De Loze de Plaisance, legal representative; by Marin De Loze de Plaisance, heir, Neuilly-sur-Seine; by Yvan De Loze de Plaisance, heir, Pointe-A-Pitre; by Florent De Loze de Plaisance, heir; by Myriam De Loze de Plaisance, heiress, both of Clermont-Ferrand, all of France

[73] Assignee: Compagnie Générale des Establissements Michelin - Michelin & Cie, Clermont-Ferrand Cedex, France

[21] Appl. No.: 08/996,983

[22] Filed: Dec. 23, 1997

[30] Foreign Application Priority Data

Dec. 27, 1996 [FR] France ................................. 96 16247

[51] Int. Cl.[7] ................................ B60C 1/00; B60C 9/18; B60C 9/20; B60C 9/22
[52] U.S. Cl. .......................... 152/531; 152/458; 152/527; 152/532; 152/533; 152/534; 152/537
[58] Field of Search ...................... 152/528, 529, 152/532, 533, 534, 535, 537, 458, 531, 527

[56] References Cited

U.S. PATENT DOCUMENTS

| | | | |
|---|---|---|---|
| 5,427,167 | 6/1995 | Watanabe et al. | 152/533 X |
| 5,465,773 | 11/1995 | Kadota et al. | 152/533 X |
| 5,535,801 | 7/1996 | Iseki et al. | 152/528 |

FOREIGN PATENT DOCUMENTS

| | | | |
|---|---|---|---|
| 0540303 | 5/1993 | European Pat. Off. | |
| 8803481 | 5/1988 | WIPO | |

*Primary Examiner*—Adrienne C. Johnstone
*Attorney, Agent, or Firm*—Baker Botts L.L.P.

[57] ABSTRACT

A tire for an airplane has radial carcass reinforcement surmounted by a crown reinforcement composed of at least three plies of textile reinforcing elements, including at least one twin zig-zag ply of two zig-zag plies "guided" at an angle $\alpha$, abbreviated to $NT\alpha°$, and at least one other "guided" ply, wherein the crown reinforcement comprises, at least between one twin zig-zag ply and one of the other "guided" plies, a decoupling intermediate layer of thickness e forming a radial distance of at least 1.0 mm between the cords of the radially lower ply and the cords of the radially upper ply surrounding the intermediate layer, the intermediate layer being formed of textile reinforcing elements coated in a rubber compound whose secant modulus of elasticity, measured at a relative elongation of between 0.06 and 0.2, is between 5 and 9 MPa.

7 Claims, 1 Drawing Sheet

TIRE FOR AIRPLANE WITH CROWN REINFORCEMENT INCLUDING AT LEAST ONE TWIN ZIG-ZAG PLY

BACKGROUND OF THE INVENTION

The present invention relates to a tire with radial carcass reinforcement, intended to support heavy loads, to be inflated to very high pressures and to run at high speed, requisites of a tire for an airplane.

A tire of this kind generally comprises radial carcass reinforcement composed of textile reinforcing elements which make an angle which may be between 80° and 100° to the circumferential direction, said plies being anchored into each bead at one or more bead wires.

The carcass reinforcement is radially surmounted by a crown reinforcement generally composed of a number of plies, some formed of textile reinforcing elements constituting the so-called working crown plies and others, radially on the outside, formed of reinforcing elements that undulate within the plane of the ply, generally made of metal, said others constituting the so-called protective crown plies because they have the function of protecting the underlying textile crown reinforcement from attack from the ground. Crown reinforcement of this kind is described in French patent FR 2 499 475, the working crown reinforcement mainly consisting of plies of textile cords oriented circumferentially, it being possible that said plies may be supplemented by plies of textile cords which are steeply inclined with respect to the circumferential direction, it being possible for the angle of inclination to be between 30° and 90° and it being possible for said plies to lie radially above or below the plies of circumferential cords.

Although remarkable in terms of high-speed endurance, the treads of the tires described hereinabove do not give satisfactory resistance to wear, this resistance generally being measured by the number of landings that can be performed. For ten years or so the assignee company has been using another structure of working crown reinforcement, this being composed of a number of layers of textile reinforcing elements obtained by winding a strip of one or more continuous elements in a path extending from one edge of the crown reinforcement to the other (a so-called zig-zag path), the angle with respect to the circumferential direction taken by said reinforcing elements being small. Known since the 1960's, this principle, like in the case of crown plies which are said to be folded back on themselves, makes it possible to avoid having the free ends of the reinforcing elements at the edges of the plies. Such examples of crown reinforcements are described, for example, in patent GB 890 648 or, more recently, in patent U.S. Pat. No. 4,838,966.

The plies obtained by winding a strip from one edge of the crown reinforcement to the other will be called zig-zag plies "guided" at an angle $\alpha$ with respect to the circumferential direction, abbreviated to $NT\alpha°$, keeping in mind the fact that at least two plies of reinforcing elements thus obtained are, because of the way in which they are obtained, inseparable, to form what will be called a "guided" twin zig-zag ply. The plies of continuous and circumferential reinforcing elements are also generally obtained by helical winding of an element or a strip of several reinforcing elements, but it is possible to use just one ply of reinforcing elements. They will be called plies "guided" at 0°, abbreviated to $NT0°$. All of said plies which are "guided" at an angle and at 0° have the distinguishing feature that they have only a few cut elements, two if the winding relates merely to one reinforcing element, and twice the number of elements forming the strip if the winding involves a strip.

Combining "guided" zig-zag plies $NT\alpha°$ formed of oriented continuous cords either with other plies "guided" at an angle or with plies of circumferential cords $NT0°$, provides, for an airplane tire, a crown reinforcement which is a very good compromise between the mass of the reinforcement and performance, particularly in terms of running speed and in terms of wear.

Also, depending on the dimensions and the running conditions, an airplane tire may have a crown reinforcement composed, for example, of seven plies of reinforcing elements and consisting, working radially from the inside outward, either of 6 $NT\alpha°$ (in the form of 3 twin zig-zag plies) and one $NT0°$, or 4 $NT\alpha°$ (in the form of 2 twin zig-zag plies), one $NT0°$ and 2 $NT\alpha°$ (in the form of a twin zig-zag ply), or 4 $NT\alpha°$ (in the form of 2 twin zig-zag plies) and 3 $NT0°$, or 3 $NT0°$ and 4 $NT\alpha°$, or 2 $NT\alpha°$ (in the form of one twin zig-zag ply), one $NT0°$ and 4 $NT\alpha°$ (2 twin zig-zag plies), or 2 $NT\alpha°$ (1 twin zig-zag ply), 3 $NT0°$ and 2 $NT\alpha°$, or 2 $NT\alpha°$ (1 twin zig-zag ply) and 5 $NT0°$, or 5 $NT0°$ and 2 $NT\alpha°$ (1 twin zig-zag ply), or 1 $NT0°$ and 6 $NT\alpha°$ (3 twin zig-zag plies).

The crown reinforcements described hereinabove, which are relatively massive, under certain running conditions, particularly at instantaneously very high speeds and overloads, prove too rigid and not strong enough, which leads to unsatisfactory endurance.

SUMMARY OF THE INVENTION

In order to overcome the drawbacks mentioned hereinabove, the airplane tire in accordance with the invention, which has crown reinforcement composed of at least three plies of textile reinforcing elements, including at least one twin zig-zag ply of two zig-zag "guided" plies $NT\alpha°$ and at least one other "guided" ply, is one wherein said reinforcement comprises, at least between one twin zig-zag ply and one of the other "guided" plies, a decoupling intermediate layer of thickness forming a radial distance of at least 1.0 mm between the cords of the radially lower ply and the cords of the radially upper ply surrounding the intermediate layer, the intermediate layer being formed of textile reinforcing elements coated in a rubber compound whose secant modulus of elasticity, measured at a relative elongation of between 0.06 and 0.2, is between 5 and 9 MPa.

The crown reinforcement may be composed of several twin zig-zag plies at angles and the intermediate layer(s) lie(s) between two twin zig-zag plies. When the crown reinforcement consists of one or more twin zig-zag plies and of one or more plies of cords "guided" at 0°, the intermediate layer(s) lie(s) between twin zig-zag plies or between twin zig-zag plies and $NT0°$ plies.

The decoupling intermediate layer may be a layer of simple vulcanized rubber compound with the appropriate properties, advantageously reinforced with lengths of cord or wire made of textile material, it being possible for the lengths to be oriented with respect to the circumferential direction at an angle either approximately equal to 0° or approximately equal to 90° and having a variable length ranging from a few mm, which then count as so-called short fibers, to a length equal to a given fraction of the circumference of the ply reinforced by said lengths, for example 1/16 of the circumference.

Said intermediate layer is preferably formed of two cut plies of continuous textile reinforcing elements parallel to one other within each ply, and one ply crossing over the other and forming an angle which may be between 10° and 45° to the circumferential direction, each reinforcing element having a free end at each edge of the ply, and said elements being coated in a rubber compound that has the claimed properties. Such plies will be called plies cut at an angle, abbreviated to NCβ°, β representing the angle that the cords make with the circumferential direction, which angle β may be the same as or different than the angle α of the cords of the so-called "guided" plies.

The radial position of the intermediate layer can vary. If n is the total number of "guided" plies NTα° and NT0°, at least half n or the integer immediately above said half of said plies lies between the decoupling intermediate layer and the radially outermost carcass reinforcement ply. As a preference, the number of plies "guided" at an angle and/or at 0° lying radially above the intermediate layer is at least equal to two, either in the form of twin zig-zag plies "guided" at an angle, or in the form of plies "guided" at 0°, or in the form of both types of ply.

When the number n is large, n being at least equal to 9 but possibly being as high as 12, it is advantageous to envisage the use of two decoupling intermediate layers in the form of two pairs of cut plies NCβ°. It is then preferable for the first intermediate layer to be radially above the twin zig-zag plies "guided" at an angle radially closest to the carcass reinforcement, and for the second intermediate layer, which will be the second pair of cut plies NCβ°, to be positioned radially below at least two "guided" zig-zag plies NTα° or two NT0° plies.

Depending on the conditions in which the airplane tire concerned will be used, it is possible to select different textile materials from which to form, on the one hand, the plies NTα° and/or NT0° and, on the other hand, the plies NCβ° in the intermediate layer(s).

DESCRIPTION OF THE DRAWINGS

The features and advantages of the invention will be better understood with the aid of the description which follows and which refers to the drawing, which nonlimitingly illustrates one embodiment, and in which.

DESCRIPTION OF PREFERRED EMBODIMENTS

Figure 1:
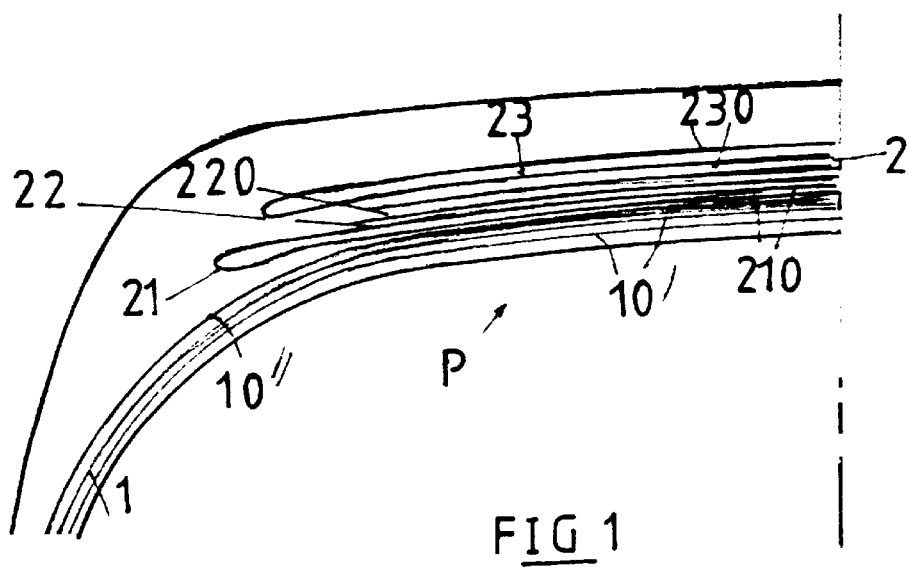
FIG. 1 is the diagrammatic depiction of a crown reinforcement according to the invention in section through the middle.
Figure 2:
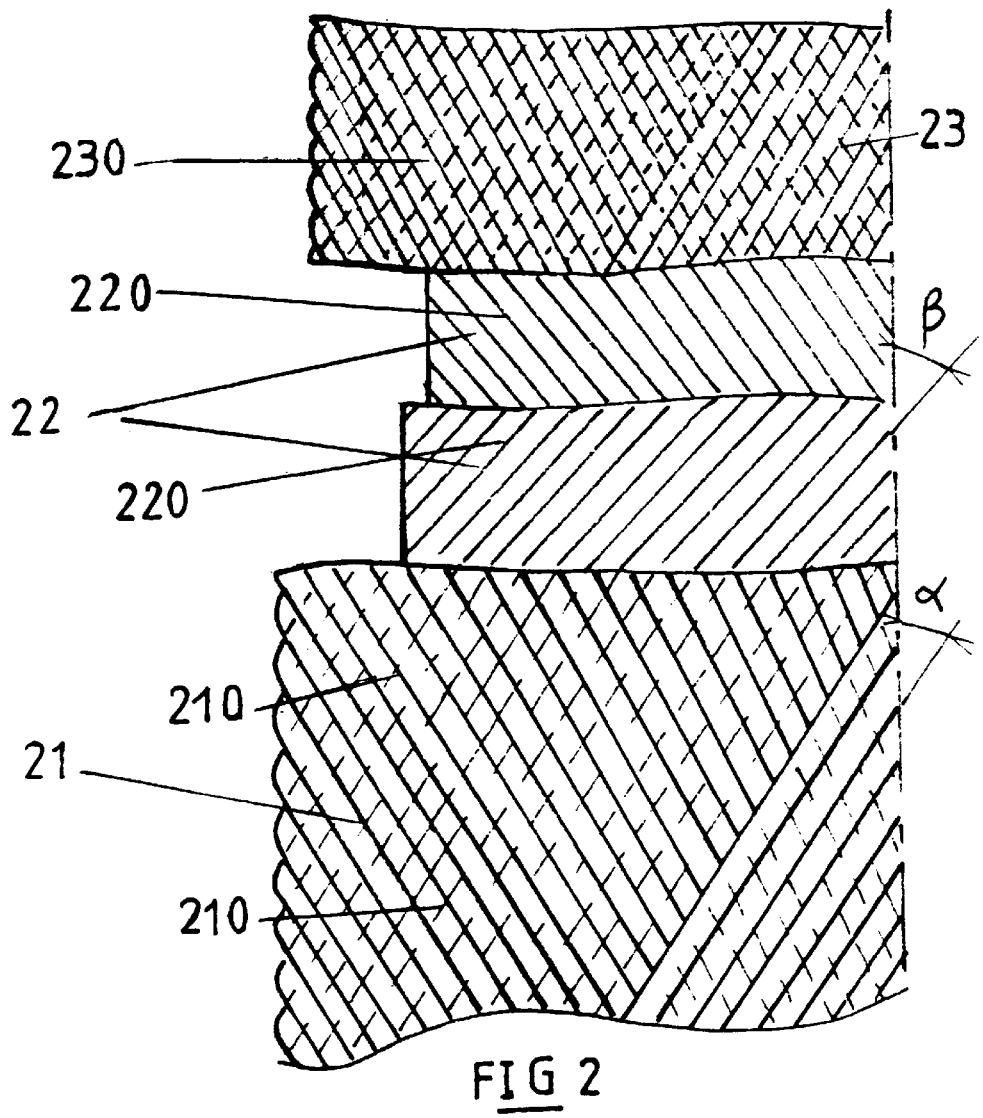
FIG. 2 shows the crown reinforcement of FIG. 1 in cut away plan view.

The tire P of size 750×230 R 15, in accordance with the invention, is a tire that has radial carcass reinforcement 1 composed of 3 plies 10 of aliphatic polyamide cords, 2 of these plies 10' being anchored to a bead wire in each bead to form wrappings, and the other ply 10" being arranged in the side walls and the beads of said tire axially outside of said wrappings, the ends of said ply being more or less located under the bead wires.

The carcass reinforcement 1 is radially surmounted by crown reinforcement 2 of textile cords. This crown reinforcement 2 is formed radially from the inside outward a) of a twin zig-zag ply 21 composed of two zig-zag NTα° plies 210, obtained by winding a strip of 8 aliphatic polyamide textile cords extending from one edge of the twin zig-zag ply 21 to the other and making an angle α of 11° to the circumferential direction, said angle being governed physically on the one hand by the width of the twin zig-zag ply, and on the other hand by the number of periods in the formation of the twin zig-zag ply 21, and b) above said twin zig-zag ply 21, an intermediate layer 22 composed of two cut plies NCβ° 220 of aliphatic polyamide textile cords, parallel to one other within each ply and one ply crossing over the other and forming an angle β of 22° to the circumferential direction, said plies having a total thickness of 3.0 mm, and c) above the intermediate layer 22, a second twin zig-zag ply 23 composed of two zig-zag NTα° plies 230 made of aliphatic polyamide, said angle then being 10°, that is to say more or less equal to the angle α formed between the cords of the radially inner twin zig-zag ply 21 and said twin zig-zag ply 23 having an axial width which is greater than the largest width of the intermediate layer but smaller than the width of the radially inner twin zig-zag ply 21.

A second example, not shown in the drawing, relates to a tire 30×11.5 R 14.5–26 PR, in which the crown reinforcement is composed, working radially from the inside outward, a) of six zig-zag NTα° plies 210 in the form of three twin zig-zag plies 21, each twin zig-zag ply being obtained by winding a strip of 8 aliphatic polyamide textile cords extending from one edge of said twin zig-zag ply to the other and forming an angle α of 12° to the circumferential direction, and the three twin zig-zag plies having, in this case, cords oriented with the same angle α (but the angles could be different), b) radially surmounting the three radially inner twin zig-zag plies 21, a layer of vulcanized compound 20 of constant axial thickness equal to 0.5 mm, surmounted by an intermediate layer 22 composed of two cut plies NCβ° 220 of aliphatic polyamide textile cords parallel to one other within each ply and one ply crossing over the other and forming an angle β of 32° to the circumferential direction, said plies having a total thickness of 3.0 mm, and c) said layers 20 and 22 separating the three radially inner twin zig-zag plies 21 from two radially upper twin zig-zag plies 23 thus forming four zig-zag NTα° plies 230 of textile cords, identical to the textile cords forming the inner twin zig-zag plies 21 and making an angle to the circumferential direction which is slightly smaller than the angle α made by the cords of said three radially inner twin zig-zag plies 21, the axial width of the widest twin zig-zag ply 23 being greater than the largest axial width of the intermediate layer 22 but smaller than the axial width of the narrowest twin zig-zag ply 21.

An advantageous alternative form of the last structure proposed consists in inserting a second intermediate layer 22 radially between the two upper twin zig-zag plies 23, this second intermediate layer being composed of two cut plies NCβ° 220 of aliphatic polyamide textile cords parallel to one another within each ply and one ply crossing over the other and forming an angle β of 32° to the circumferential direction.

It is possible to replace at least one of the radially upper twin zig-zag plies with two "guided" plies with circumferential cords, and the intermediate layer is advantageously composed of a rubber compound reinforced with lengths of textile cord oriented at 0°.

The structures described hereinabove have, unexpectedly, made it possible to achieve a very marked improvement in the endurance of crown reinforcements, in the two sizes of tire studied. In simulated running on a test wheel, under so-called "taxiway-take-off" conditions, consisting of conditions that correspond to running along the parking areas at the end of the runway, followed by conditions that correspond to the take-off itself, the gain in number of cycles is close to 40% for the first example mentioned (50 cycles as compared with 35 cycles), while in the second example described the number of cycles is more than doubled (25 cycles as compared with 10 cycles), a cycle corresponding in the first instance, to running along the "taxiway" at a speed of 35 km/h and a nominal load that causes the tire to deflect by 37%, followed by a take-off with a speed ranging from 0 to 130 km/h with the nominal load during most of the take-off and a peak overload at the end of take-off giving the tire a deflection of approximately 55%, and in the second instance, to running along the "taxiway" for 6 km at a low speed (close to 55 km/h) and under the nominal load (37% deflection) followed by a take-off with a speed ranging from 0 to 450 km/h, the load applied to the tire fluctuating between values that correspond to a 33%–37% range of deflection. It goes without saying, that the comparisons were carried out with tires which had crown reinforcements composed of the same elements, with the exception of the intermediate layers.

We claim:

1. A tire for an airplane, having radial carcass reinforcement, surmounted by crown reinforcement composed of at least three plies of textile reinforcing elements, including at least one twin zig-zag ply of two zig-zag plies guided at an angle $\alpha$, abbreviated to $NT\alpha°$, and at least one other guided ply, wherein the crown reinforcement comprises, at least between one twin zig-zag ply and one of the other guided plies, a decoupling intermediate layer of thickness e forming a radial distance of at least 1.0 mm between the cords of the radially lower ply and the cords of the radially upper ply surrounding the intermediate layer, said intermediate layer being formed of textile reinforcing elements coated in a rubber compound whose secant modulus of elasticity, measured at a relative elongation of between 0.06 and 0.2, is between 5 and 9 MPa.

2. The tire as claimed in claim 1, wherein said decoupling intermediate layer is reinforced by lengths of wire or cord made of textile material, said lengths being oriented with respect to the circumferential direction at an angle approximately equal to 0°.

3. The tire as claimed in claim 1, wherein the intermediate layer is two cut plies, abbreviated to $NC\beta°$, of continuous textile reinforcing elements parallel to one another within each ply, and one ply crossing over the other and forming an angle $\beta$ between 10° and 45° to the circumferential direction.

4. The tire as claimed in claim 1, wherein the crown reinforcement comprises a total number n of zig-zag guided plies $NT\alpha°$ and plies guided at 0°, abbreviated to $NT0°$, at least half of said plies lying between the decoupling intermediate layer and the radially outermost ply of the carcass reinforcement.

5. The tire as claimed in claim 4, wherein the number of guided plies $NT\alpha°$ and/or $NT0°$ lying radially above the intermediate layer is at least equal to two, either in the form of a guided twin zig-zag ply or in the form of plies at 0°.

6. The tire as claimed in claim 4, wherein the crown reinforcement comprises at last 9 guided plies $NT\alpha°$ and $NT0°$, and comprises two decoupling intermediate layers in the form of two pairs of cut plies, abbreviated to $NC\beta°$, of continuous textile reinforcing elements parallel to one another within each ply, with one ply crossing over the other in each pair and forming an angle $\beta$ between 10° and 45° to the circumferential direction.

7. The tire as claimed in claim 6, wherein the first intermediate layer, which is a pair of cut plies $NC\beta°$, is radially above the guided twin zig-zag ply or plies radially closest to the carcass reinforcement, and wherein the second intermediate layer, which is a second pair of cut plies $NC\beta°$, is positioned radially beneath at least two guided zig-zag plies $NT\alpha°$ or two $NT0°$ plies.

* * * * *